US008271519B2

(12) United States Patent
Young

(10) Patent No.: US 8,271,519 B2
(45) Date of Patent: Sep. 18, 2012

(54) SYSTEMS AND METHODS FOR FAST REMOTE DATA ACCESS FROM A SPREADSHEET

(75) Inventor: Brian Fletcher Young, Cary, NC (US)

(73) Assignee: SAS Institute Inc., Cary, NC (US)

( * ) Notice: Subject to any disclaimer, the term of this patent is extended or adjusted under 35 U.S.C. 154(b) by 136 days.

(21) Appl. No.: 12/917,037

(22) Filed: Nov. 1, 2010

(65) Prior Publication Data
US 2012/0110001 A1     May 3, 2012

(51) Int. Cl.
*G06F 7/00* (2006.01)
(52) U.S. Cl. ..................................... 707/769
(58) Field of Classification Search .............. 707/769
See application file for complete search history.

(56) References Cited

U.S. PATENT DOCUMENTS

| 6,898,760 B2 | 5/2005 | Bedford et al. |
| 7,266,763 B2 | 9/2007 | Peyton-Jones et al. |
| 7,447,680 B2 | 11/2008 | Day et al. |
| 2006/0036939 A1* | 2/2006 | Hobbs et al. ............. 715/503 |
| 2009/0204566 A1 | 8/2009 | Barsness et al. |
| 2009/0276482 A1* | 11/2009 | Rae et al. ............. 709/201 |

* cited by examiner

*Primary Examiner* — Jensen Hu
(74) *Attorney, Agent, or Firm* — Jones Day

(57) ABSTRACT

Systems and methods are provided for importing data into a spreadsheet from an external data source. A set of cells containing formulas is identified. A first user defined function is executed to access a particular data record from the external data source. The execution of the first user defined function includes determining which of the stored formulas contain user defined functions to access data records from the external data source, resolving parameters of the identified user defined functions, generating a bulk query to the external data source requesting data for certain user defined functions having sufficient parameters resolved for identifying a data record plus more data records than are specified by the user defined functions, storing the data records specified in a hash table, storing the more data records than are specified in a memory, and returning the particular data record to the spreadsheet.

19 Claims, 10 Drawing Sheets

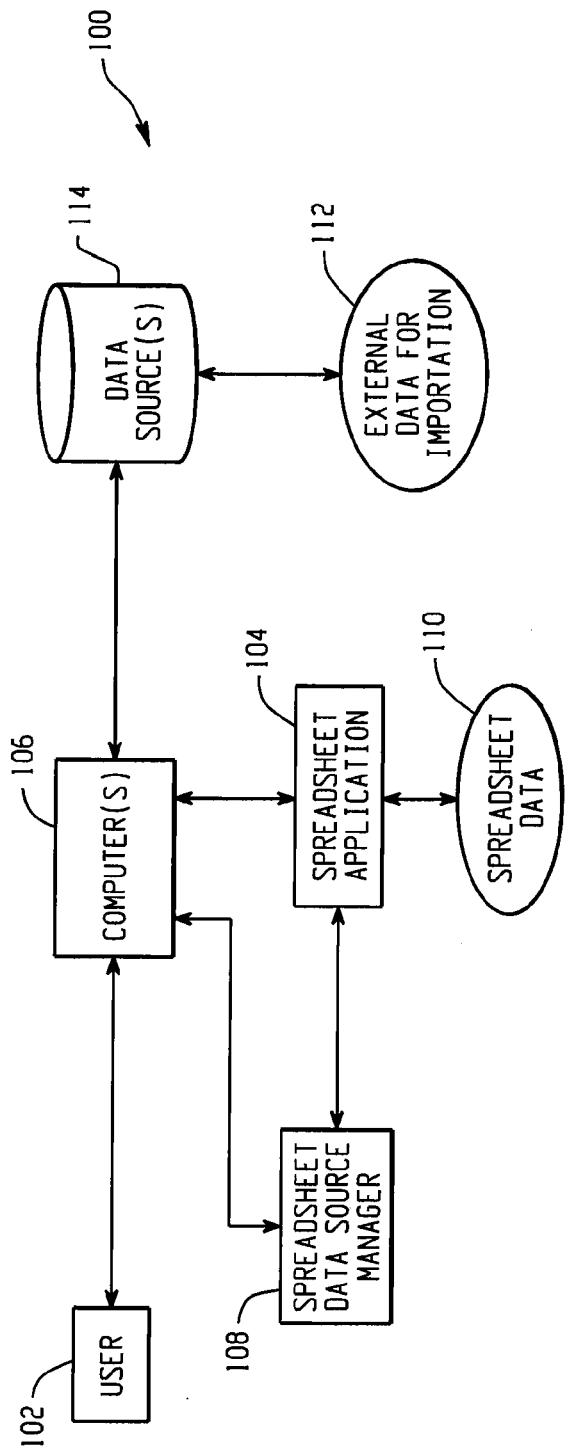
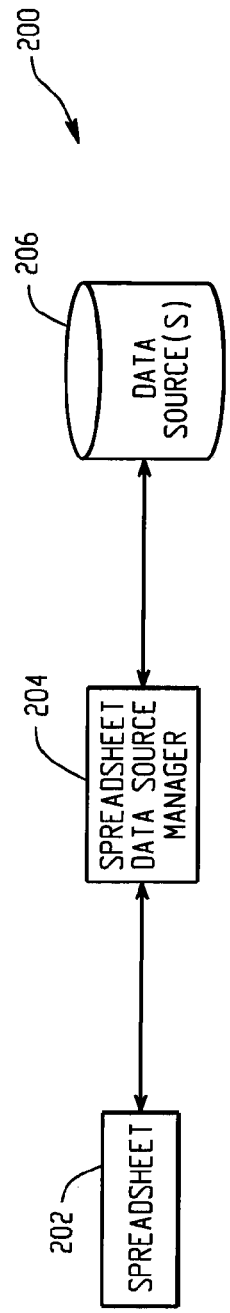

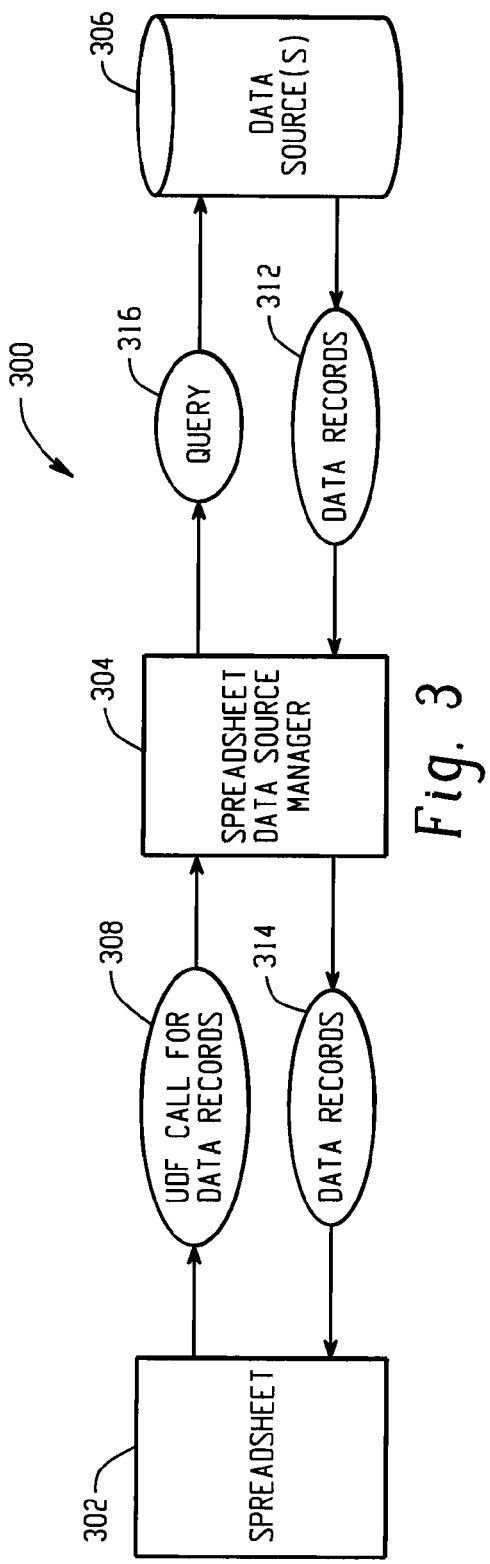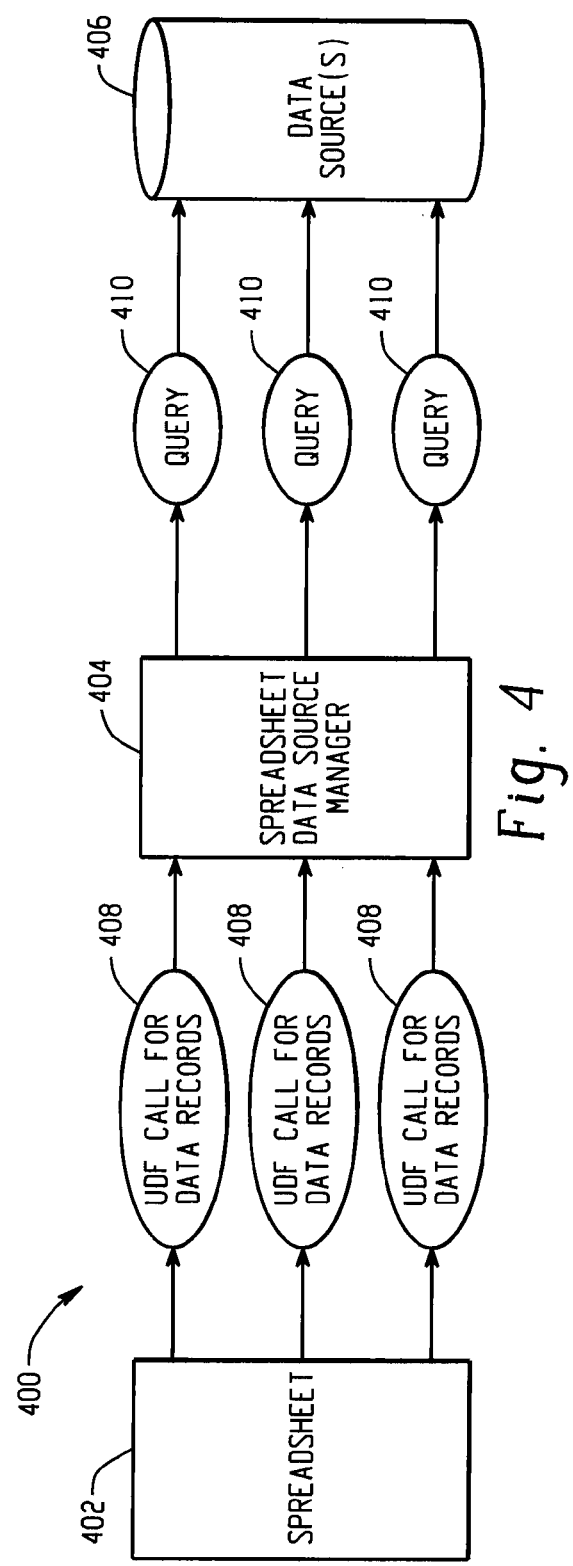

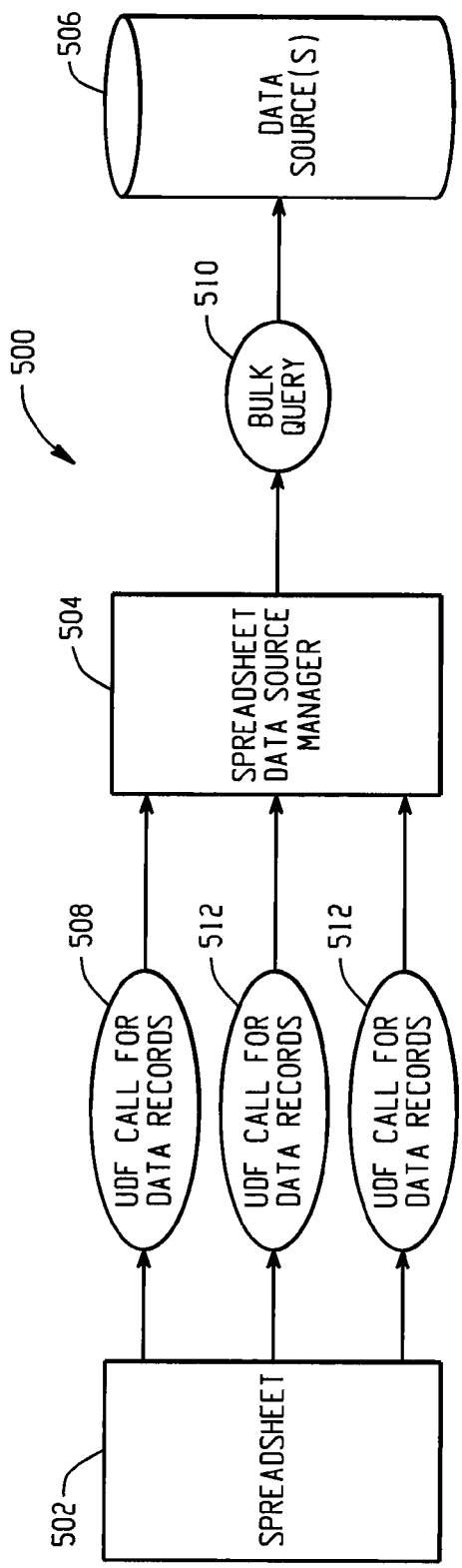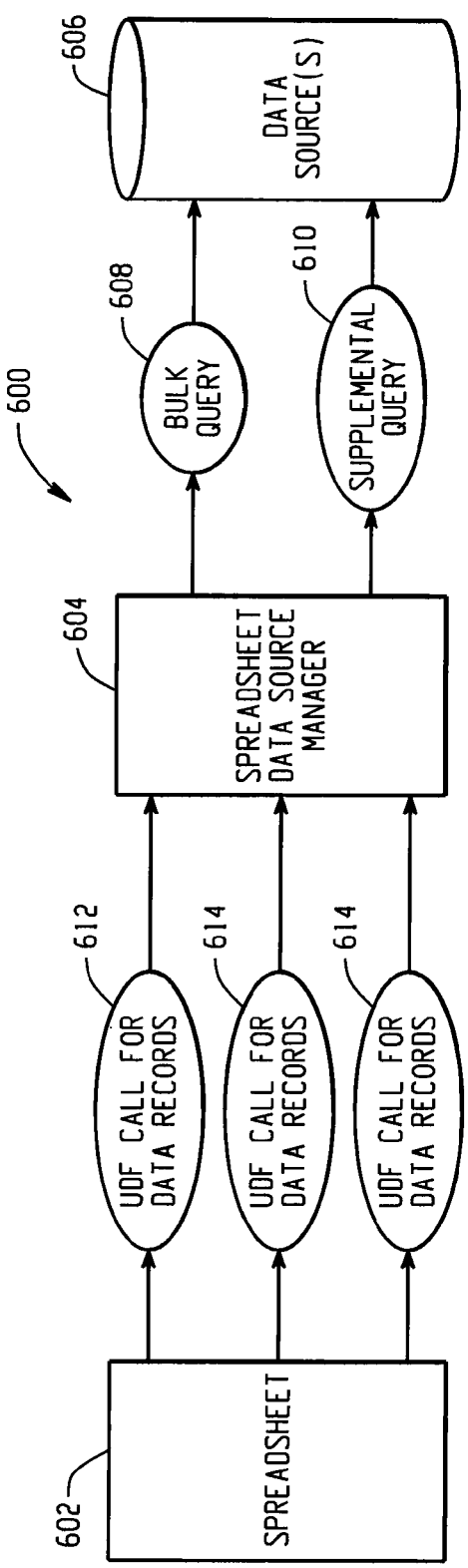

SYSTEMS AND METHODS FOR FAST REMOTE DATA ACCESS FROM A SPREADSHEET

TECHNICAL FIELD

The present disclosure relates generally to database management and more particularly to interfacing a spreadsheet with an external data source.

BACKGROUND

A spreadsheet is a computer application that simulates a paper, accounting worksheet. It displays multiple cells that together make up a grid consisting of rows and columns, each cell containing alphanumeric text, numeric values, or formulas. A formula defines how the content of that cell is to be calculated from the contents of any other cell, or combination of cells, each time a cell is updated. Spreadsheets are frequently used for financial information because of their ability to re-calculate the entire sheet automatically after a change to a single cell is made.

Example spreadsheets include VisiCalc™, Lotus 1-2-3™, Microsoft Excel™, Apple Numbers™, OpenOffice.org Calc™, Gnumeric™, IBM Lotus Symphony™, KSpread™, ZCubes-Calci™, Resolver One™, as well as others.

SUMMARY

In accordance with the teachings provided herein, systems and methods are provided for importing data into a spreadsheet from an external data source. A set of cells containing formulas may be identified. A first user defined function may be executed to access a particular data record from the external data source. The execution of the first user defined function may include determining which of the stored formulas contain user defined functions to access data records from the external data source, resolving parameters of the identified user defined functions, generating a bulk query to the external data source requesting data for certain user defined functions having sufficient parameters resolved for identifying a data record plus more data records than are specified by the user defined functions, storing the data records specified in a hash table, storing the more data records than are specified in a memory, and returning the particular data record to the spreadsheet.

As another example, a computer-implemented system for importing data into a spreadsheet from an external data source may include a data processor. The system may further include a computer-readable memory encoded with instructions for commanding the data processor to execute steps. In those steps, a set of cells containing formulas may be identified. A first user defined function may be executed to access a particular data record from the external data source. The execution of the first user defined function may include determining which of the stored formulas contain user defined functions to access data records from the external data source, resolving parameters of the identified user defined functions, generating a bulk query to the external data source requesting data for certain user defined functions having sufficient parameters resolved for identifying a data record plus more data records than are specified by the user defined functions, storing the data records specified in a hash table, storing the more data records than are specified in a memory, and returning the particular data record to the spreadsheet.

As an additional example, a computer-readable memory may be encoded with instructions for commanding a data processor to execute steps of a method for importing data into a spreadsheet from an external data source. In the method, a set of cells containing formulas may be identified. A first user defined function may be executed to access a particular data record from the external data source. The execution of the first user defined function may include determining which of the stored formulas contain user defined functions to access data records from the external data source, resolving parameters of the identified user defined functions, generating a bulk query to the external data source requesting data for certain user defined functions having sufficient parameters resolved for identifying a data record plus more data records than are specified by the user defined functions, storing the data records specified in a hash table, storing the more data records than are specified in a memory, and returning the particular data record to the spreadsheet.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 1 depicts a computer-implemented environment for importing data into a spreadsheet.

FIG. 2 is a block diagram depicting a logical relationship among a spreadsheet, a spreadsheet data source manager, and a data source that is external to the spreadsheet.

FIG. 3 is a block diagram further depicting the interaction among a spreadsheet, a spreadsheet data source manager, and an external data source.

FIG. 4 is a block diagram depicting multiple calls for data from a spreadsheet to an external data source via a spreadsheet data source manager.

FIG. 5 is a block diagram depicting interactions among a spreadsheet, spreadsheet data source manager, and external data source with reduced remote data accesses.

FIG. 6 is a block diagram depicting interaction among a spreadsheet, spreadsheet data source manager, and an external data source that utilizes a bulk query and a supplemental query.

DETAILED DESCRIPTION

Figure 7:
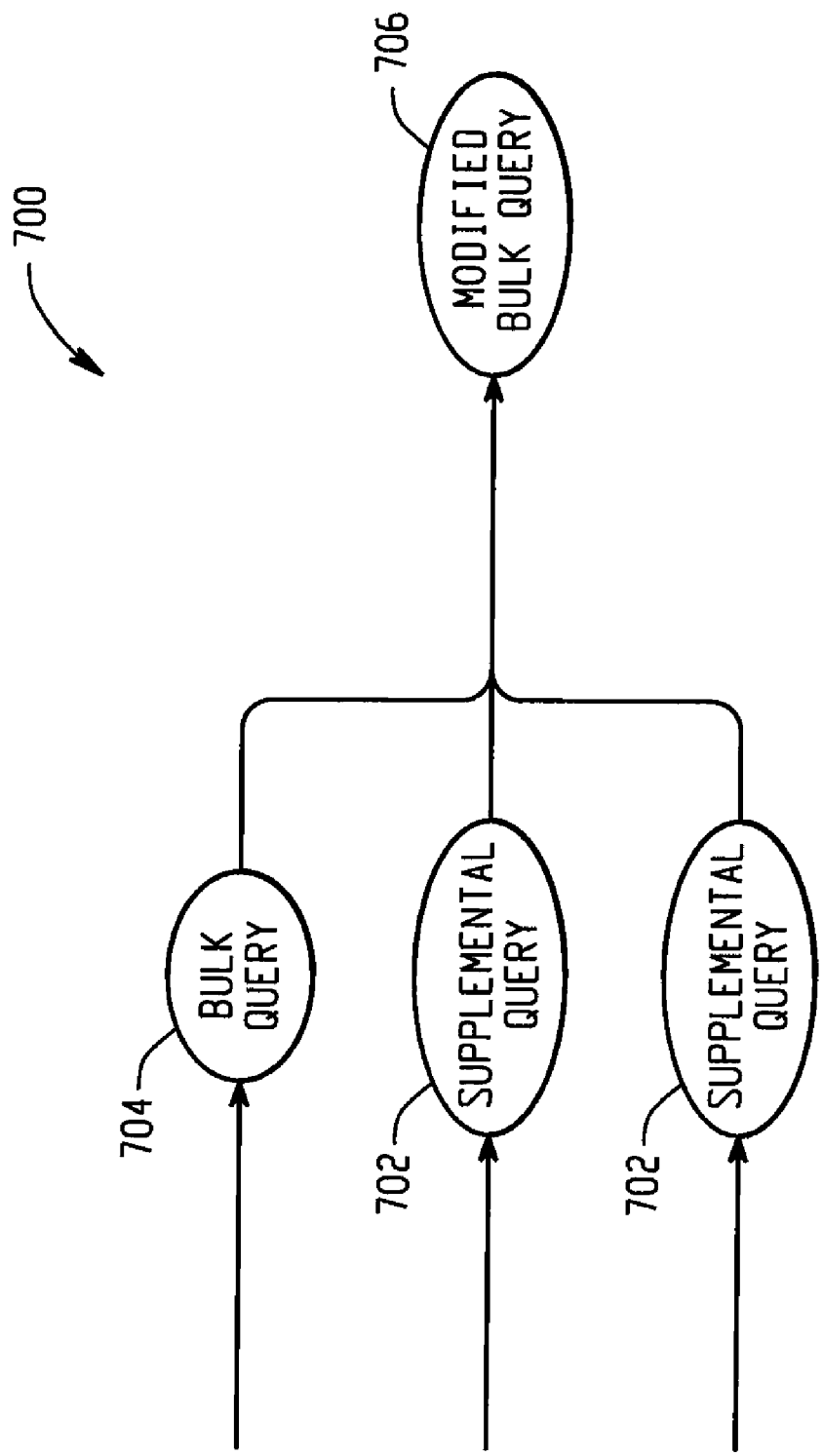
FIG. 7 depicts the incorporation of supplemental queries into a bulk query to generate a modified bulk query.

FIG. 1 depicts a computer-implemented environment for importing data into a spreadsheet. A user 102 interacts with a spreadsheet application 104 on one or more computers 106 which in turn interacts with a spreadsheet data source manager 108 that is also responsive to the one or more computers 106. For example, the spreadsheet data source manager 108 may be an add-on to the spreadsheet application 104.

The user 102 may interact with a spreadsheet application 104 to enter values and formulas into cells of the spreadsheet as spreadsheet data 110, or the user 102 may load an existing spreadsheet that already has values and formulas loaded into it. The user 102 may desire to access individual data values that exist outside of the spreadsheet for use in the cells. Access to data external to the spreadsheet can be accomplished through user defined functions (UDFs). UDFs are custom functions that can be incorporated into a cell's formula. Traditionally, each use of an external data access UDF retrieves and returns an individual value of a data record from an external data source. For example, the UDF may access an individual value at a particular crossing in a data cube.

FIG. 2 is a block diagram depicting a logical relationship among a spreadsheet 202, a spreadsheet data source manager 204, and a data source 206 that is external to the spreadsheet (external data source). The spreadsheet 202 processes values and formulas in cells of the spreadsheet. When the spreadsheet encounters a UDF requesting data from an external data source 206, that UDF is presented to the spreadsheet data source manager 204, which interacts with the external data source 206 to retrieve the requested data and return the requested data to the spreadsheet 202.

FIG. 3 is a block diagram further depicting the interaction among a spreadsheet 302, a spreadsheet data source manager 304, and an external data source 306. When the spreadsheet 302 encounters a UDF requesting data from an external data source 306, the UDF call 308 is passed to the spreadsheet data source manager 304, which executes the UDF. The spreadsheet data source manager 304 interacts with the external data source 306 to access the data record in the external data source 306 identified by the UDF by issuing a query 316 to the external data source 306. The spreadsheet data source manager 304 receives the identified data records 312 from the external data source 306 and returns the data records and/or the data record values 314 to the spreadsheet 302.

FIG. 4 is a block diagram depicting multiple calls for data from a spreadsheet 402 to an external data source(s) 406 via a spreadsheet data source manager 404. When the spreadsheet encounters a cell containing a UDF requesting external data, a UDF call for one or more data records 408 is provided to the spreadsheet data source manager 404, which issues a query 410 to the external data source 406. The external data source 406 returns the requested data records to the spreadsheet data source manager 404, and the requested data is returned to the spreadsheet 402.

Individual calls for external data by a number of UDFs can affect performance because a cost is associated with each retrieval from the external data source. The external data for importation may be local to the computer running the spreadsheet or may be remote, such as in one or more remote data stores 406. Remote data accesses may be more costly than local data accesses due to increased communication latency across the communication links between the spreadsheet 402 and the spreadsheet data source manager 404 and the spreadsheet data source manager 404 and the external data source 406. Thus, performance may be improved by reducing the number of remote data accesses.

FIG. 5 is a block diagram depicting interactions among a spreadsheet 502, spreadsheet data source manager 504, and external data source 506 with reduced remote data accesses. When the spreadsheet 502 encounters a UDF requesting external data, a UDF call for data 508 is provided to the spreadsheet data source manager 504. The spreadsheet data source manager 504 may be able to reduce the number of queries executed to the external data source 506. When the spreadsheet data source manager 504 is able to anticipate some of the data records that will be requested by UDF calls 508, the spreadsheet data source manager 504 can pre-access those predicted data records from the data store 506 via a bulk query 510. The bulk query 510 requests not only the data record identified in first UDF call for data records 508 received from the spreadsheet 502; the bulk query 510 also requests records from the external data source 506 that the spreadsheet data source manager 504 predicts will be requested by future UDF calls for data records 512.

Such a prediction may be accomplished in a variety of ways. For example, the spreadsheet data source manager 504 may periodically identify cells of the spreadsheet containing formulas. When a first UDF call for records is received from the spreadsheet 508, the spreadsheet data source manager 504 may determine which of the identified formulas contain a UDF to access data records from an external data source. The spreadsheet data source manager 504 may then attempt to resolve as many parameters of the located UDF external data requests as possible based on the current state of the spreadsheet 502.

For example, the spreadsheet data source manager 504 may be able to resolve parameters that are explicitly recited in the identified UDF (e.g., the parameter appears as a value or a string) or parameters that are references to values or strings in other cells. Other parameters that rely on more complex dependencies may not be resolvable because of security protocols present on some spreadsheets. For example, security protocols may prevent a UDF and, thus, the spreadsheet data source manager 504 from manipulating values in cells other than the cell containing the currently executing UDF. Thus, if a parameter requires evaluation of formulas (e.g., a lookup table) in another cell, the spreadsheet data source manager 504 may not be able to resolve that parameter. Additionally, the complexity of the expression of the dependency (e.g., a formula) may make it cost-prohibitive to evaluate (e.g., excessive execution time to evaluate).

Following resolution of parameters of identified UDFs, the spreadsheet data source knows certain data records that are likely to be requested by future UDFs 512 based on the current state of the spreadsheet. The spreadsheet data source manager 504 formulates a bulk query 510 that requests the data record requested by the first UDF call 508, the data records identified as being likely to be requested by future UDFs 512, and may also request additional records not explicitly noted by resolved UDF parameters. The spreadsheet data source manager 504 receives the data records from the external data store 506 and returns the data value requested by the first UDF call 508 to the spreadsheet 502. The spreadsheet data source manager 504 also stores the additional data records for fast access by the future UDF calls for data 512. For example, the spreadsheet data source manager 504 may generate a hash table that stores data records identified by resolved parameters of other UDF calls 512 for fast retrieval when those future UDF calls are provided to the spreadsheet data source manager 504. The spreadsheet data source manager may also store the additional data values not explicitly requested by the resolved parameters of future UDF calls 512. Those additional data values may be stored in a memory or cache for future retrieval without requiring a query to an external data source 506.

FIG. 6 is a block diagram depicting interaction among a spreadsheet 602, spreadsheet data source manager 604, and an external data source 606 that utilizes a bulk query 608 and a supplemental query 610. When the spreadsheet 602 encounters a UDF that requests data from an external data source 606, a UDF call 612 is provided to the spreadsheet data source manager 604. The spreadsheet data source manager 604 may resolve parameters of other UDF calls 614 identified in the spreadsheet, and execute a bulk query 608 to access the data records identified in the first UDF call 612 and the other UDF calls 614 according to resolvable parameters. The data record requested by the first UDF call 612 is returned to the spreadsheet, and the data records returned from the data store 606 based on the bulk query 608 may be stored by the spreadsheet data source manager for fast future access.

When one of the future UDF calls 614 requests a data record that was not retrieved by the bulk query 608, the spreadsheet data source manager 604 may request that data record from the external data store 606 via a supplemental query 610. The supplemental query 616 returns the requested value to the spreadsheet data source manager 604, which provides the value to the spreadsheet 602. The spreadsheet data source manager may store the value retrieved by the supplemental query 610, such as in a hash table or cache, for fast future access.

While supplemental queries 610 can be used to fetch stray data records that are not predicted by the spreadsheet data source manager 604, repeated supplemental queries 610 to external data sources 606 can become costly. Thus, the spreadsheet data source manager 604 may incorporate the data records identified in supplemental queries 610 into a modified bulk query for future use. FIG. 7 depicts the incorporation of supplemental queries 702 into a bulk query 704 to generate a modified bulk query 706. The records identified in supplemental queries 702 are incorporated into a bulk query 704 so that those identified records will be retrieved when the modified bulk query 706 is executed. For example, a modified bulk query 706 may be executed periodically, such as after a prespecified period of time has elapsed or after a prespecified number of supplemental queries 702 are executed.

Figure 8:
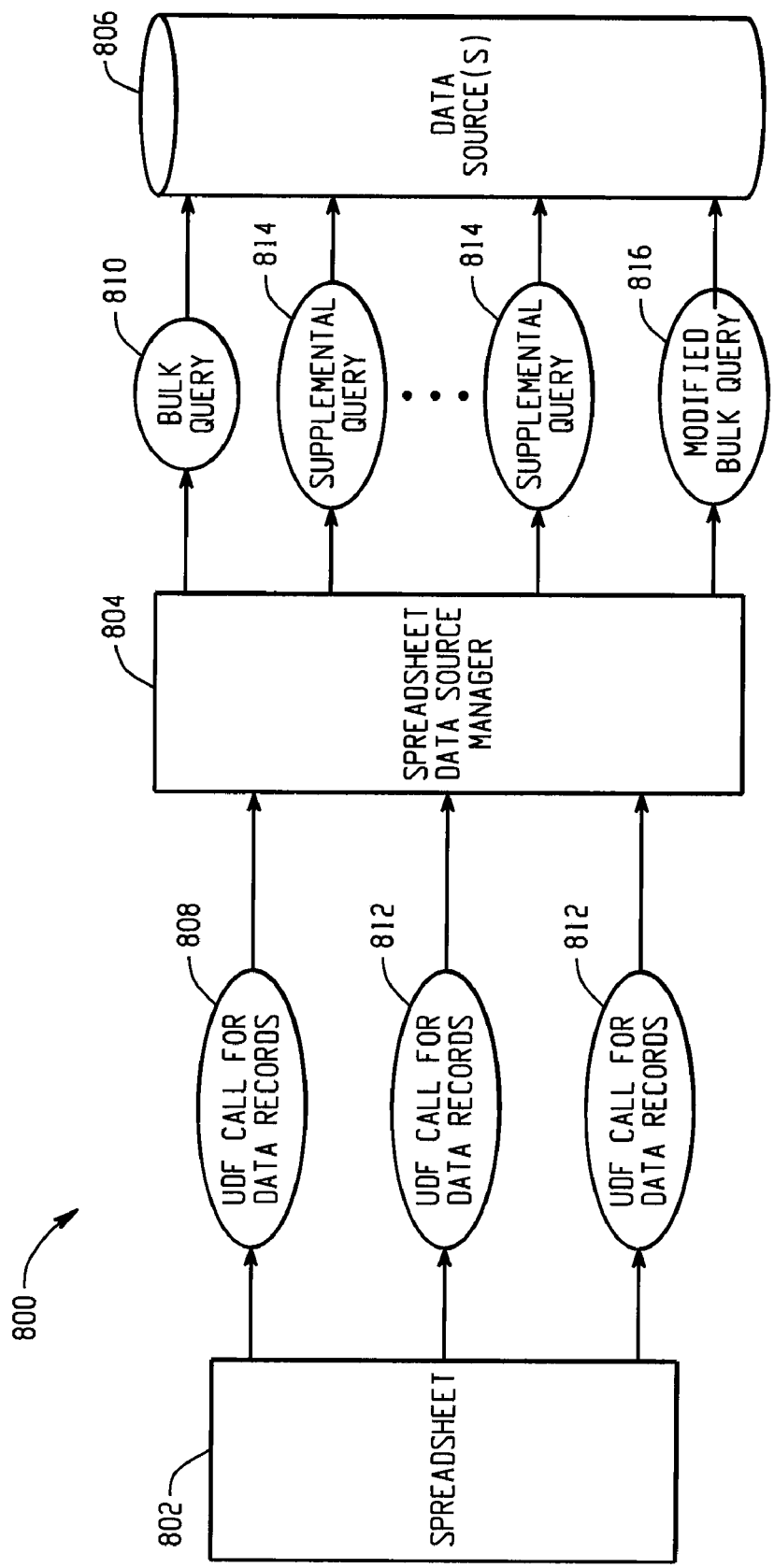
FIG. 8 is a block diagram depicting the execution of a modified bulk query following the execution of a prespecified number of supplemental queries.

FIG. 8 is a block diagram depicting the execution of a modified bulk query following the execution of a prespecified number of supplemental queries. A spreadsheet 802 is responsive to a spreadsheet data source manager 804 which is further responsive to one or more external data stores 806. The spreadsheet data source manager 804 receives a first UDF call for one or more data records based on a UDF encountered in a cell of the spreadsheet 802. The spreadsheet data source manager 804 reviews other UDFs requesting external data in other cells in the spreadsheet 802 and generates a bulk query 810 that requests the data record identified in the first UDF call 808, data records identified in other UDFs 812 based on resolved parameters of those UDFs, and additional data records not specifically noted by the UDFs having sufficient parameters resolved for identifying external data records.

When a later UDF call 812 requests a data record that the spreadsheet data source manager 804 has not previously accessed and stored, a supplemental query 814 may be issued to access that data record from the external data source 806. The spreadsheet data source manager 804 may incorporate the data record sought by the supplemental query 814 into a modified bulk query 816 for later access. When a predetermined number of supplemental queries 814 are issued, the spreadsheet data source manager 804 may execute the modified bulk query 816 to refresh the data records it has stored, such as in a hash table, cache, and/or other storage.

Figure 9:
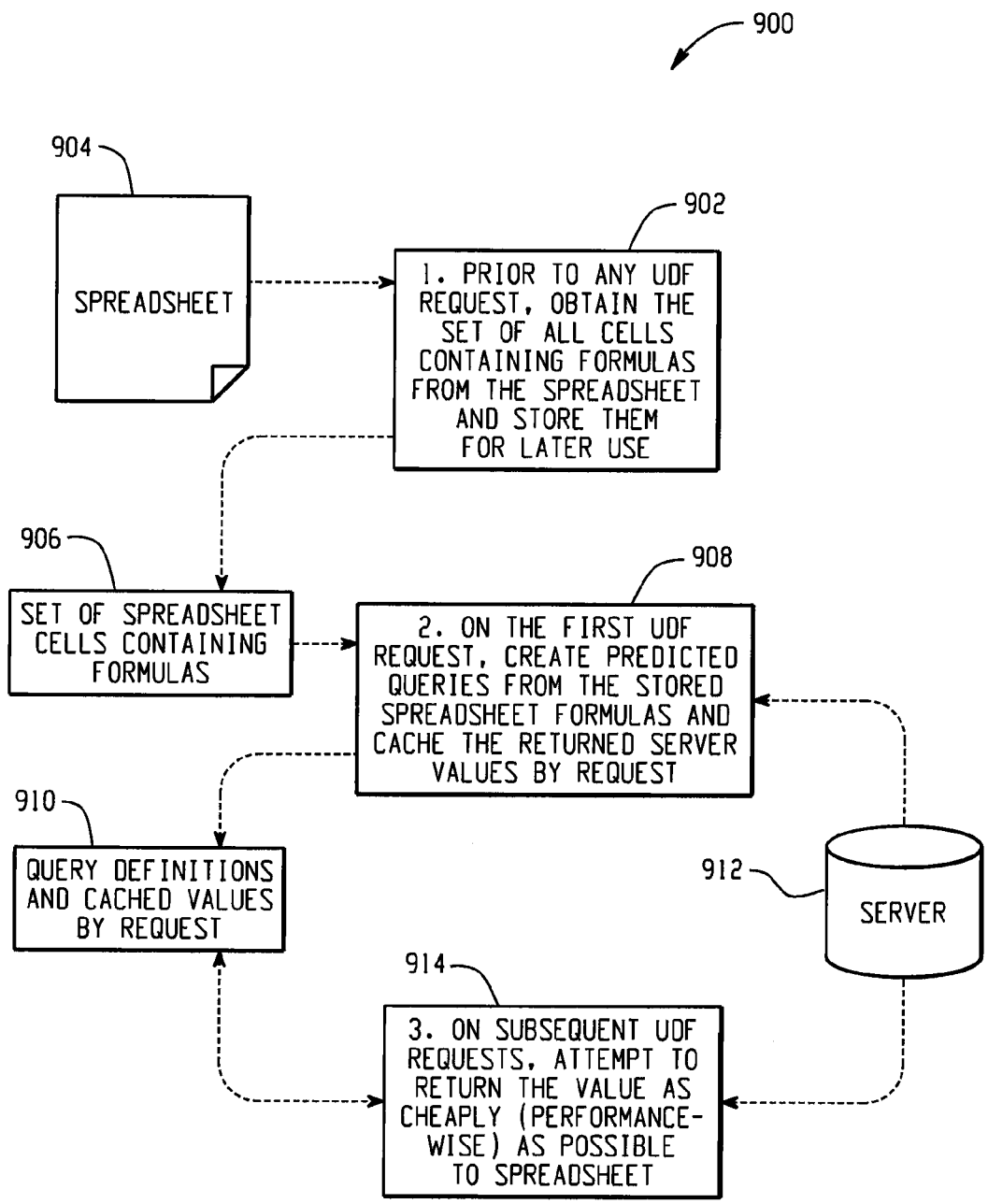
FIG. 9 is a flow diagram depicting example accesses to an external data source for a spreadsheet.

FIG. 9 is a flow diagram depicting example accesses to an external data source for a spreadsheet. At 902, prior to a UDF request being received from the spreadsheet 904, a spreadsheet data source manager may obtain the set of all cells containing formulas from the spreadsheet and store them at 906. When the spreadsheet encounters a UDF request for data from an external data source, the spreadsheet data source manager creates a predicted query from the stored spreadsheet formulas and caches the values at 910 returned from the external data source 912. The spreadsheet data source manager returns the value requested by the first UDF request. For subsequent UDF requests, the spreadsheet data source manager attempts to return values stored at 910. If the spreadsheet data source manager does not have a requested field value stored at 910, the spreadsheet data source manager may access the requested field value from the external data source server 912.

Figure 10:
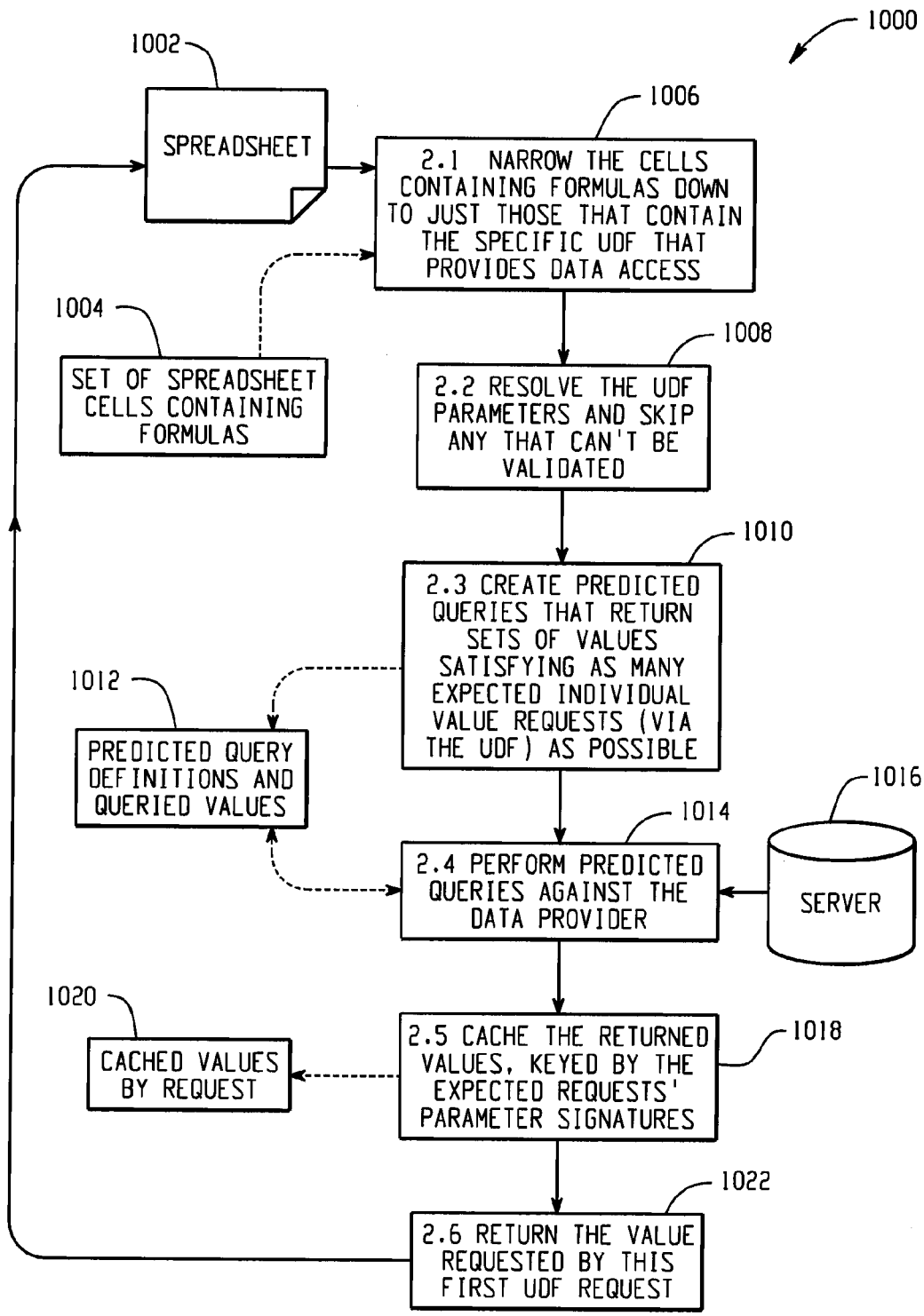
FIG. 10 depicts example details of functions performed upon receiving a first UDF request for data from an external data source.

FIG. 10 depicts example details of functions performed upon receiving a first UDF request for data from an external data source. Upon receiving a first UDF request from the spreadsheet 1002, the spreadsheet data source manager narrows the cells to be considered from those containing formulas 1004 to those that contain a UDF for data access at 1006. The spreadsheet data source manager resolves UDF parameters that it can and skips any that cannot be validated at 1008. At 1010, the spreadsheet data source manager creates a predicted bulk query 1012 that returns sets of values satisfying as many expected individual value requests from noted UDFs in spreadsheet cells as it is able. The bulk query may also request data values that are not explicitly noted in any UDF requests having sufficient parameters resolved for identifying external data source data records. At 1014, the predicted bulk query 1012 is submitted to the external data source(s) 1016, which return the requested data values. At 1018, the spreadsheet data source manager stores the returned values to 1012, where they will be available for future requests. For example, the spreadsheet data source manager may utilize a hash table to store data values for UDF requests that have sufficient parameters resolved according to the external data source field requested in those requests at 1012. The spreadsheet data source manager may also store additional values returned by the predicted bulk query for potential later access at 1020. At 1022, the spreadsheet data source manager returns the value requested by the first UDF request to the spreadsheet.

Figure 11:
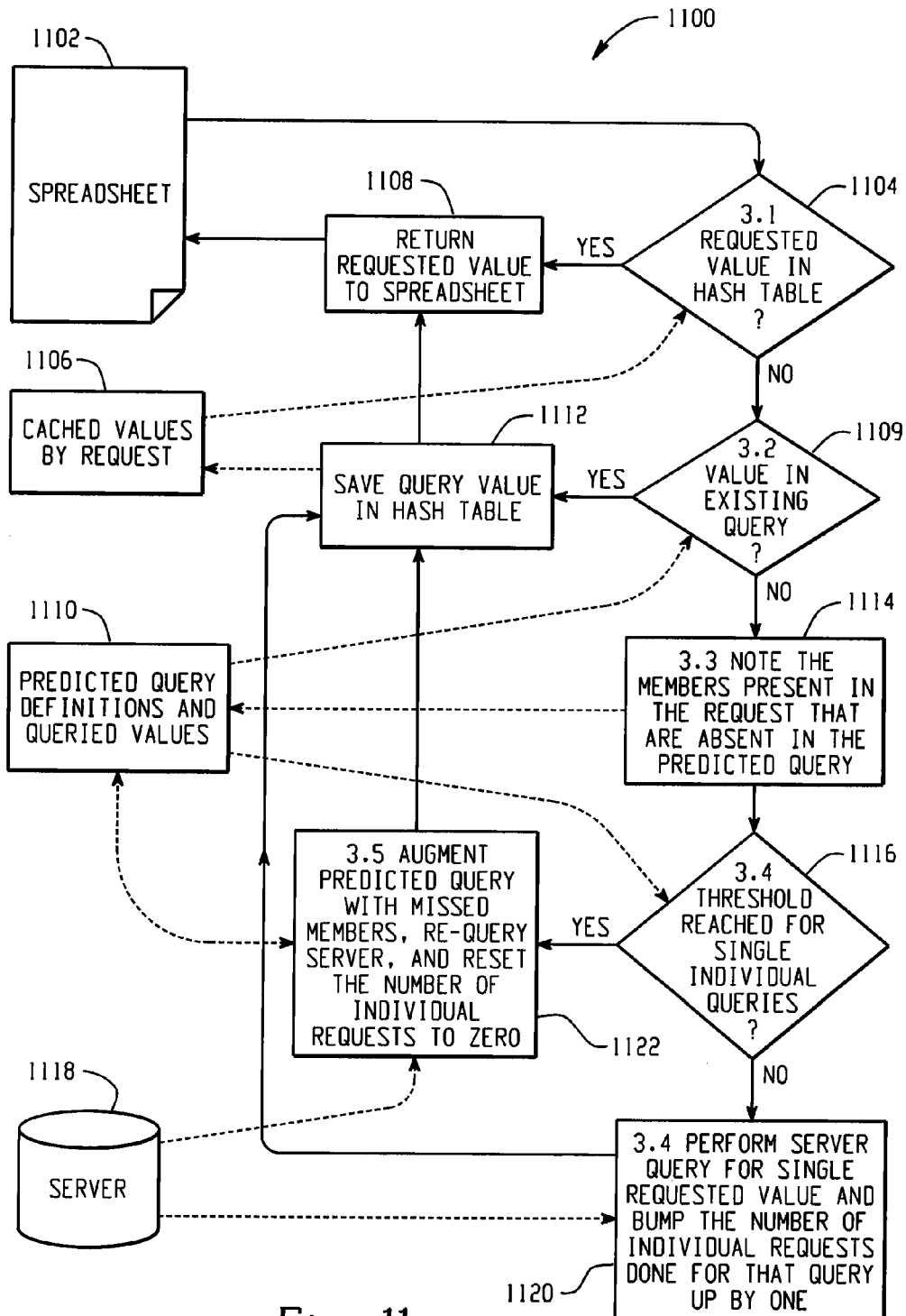
FIG. 11 is a flow diagram depicting example processing for subsequent UDF requests.

FIG. 11 is a flow diagram depicting example processing for subsequent UDF requests. A subsequent UDF request for data from an external data source is received from the spreadsheet 1102. The parameters for the received UDF are resolved, and the spreadsheet data source manager can determine whether the UDF is requesting a data value that has previously been stored or whether a supplemental query is necessary. At 1104, the spreadsheet data source manager receives a UDF request from the spreadsheet 1102 identifying a data record. The spreadsheet data source manager determines whether the requested value is stored in the hash table 1106. When the value is in the hash table 1106, the value is returned to the spreadsheet at 1108.

When the value is not in the hash table 1106, the spreadsheet data source manager determines whether the value is another value that has been retrieved from an external data source but not stored in the hash table 1106 at 1109. These other values may be stored in a memory or a cache along with the predicted bulk query at 1110. If the value is in the memory at 1110, then the value is added to the hash table 1106 at 1112, and the value is returned to the spreadsheet at 1108.

When the value is not already stored in the memory 1110, then the data record requested is noted in the memory 1110 at 1114. A determination is then made at 1116 as to whether a supplemental query should be issued or whether a modified bulk query should be used. When a threshold for individual supplemental queries has not been reached, a supplemental query is issued to the external data source 1118 at 1120, and a counter of the number of supplemental queries issued is incremented. The requested value is added to the hash table 1106 at 1112, and the requested value is returned to the spreadsheet at 1108.

When the threshold for individual supplemental queries has been reached, a modified bulk query is formed at 1122 based on the supplemental queries issued since the last bulk query, the previous bulk query, and the currently requested data record such that the modified bulk query will request at least all of those values. The modified bulk query is sent to the server 1118 and values are returned. The requested value is added to the hash table 1106 at 1112, and the requested value is returned to the spreadsheet at 1108.

Determination of whether the threshold has been met at 1116 can be accomplished in a variety of ways. For example, the counter can be reset each time it reaches a predetermined (e.g., user-specified) threshold. As another example, a modulus operator may be used. In that example, when a value of the counter modulus the threshold value equals zero, the threshold has been met.

Following is an example that includes example code and logic for implementing a spreadsheet data source manager. Prior to receipt of the first UDF call the spreadsheet data source manager may scan the spreadsheet for all cells containing a formula. For example, this could be accomplished via a SpecialCells method on the range object, where Cells represents the set of all cells in a worksheet of the spreadsheet:

```
Range formulaCells=worksheet.Cells.SpecialCells
    (Excel.XlCellType.xlCellTypeFormulas, Miss-
    ing.Value);
```

Such a procedure may be done for each worksheet, with each resulting set of formula cells stored in a hash table by worksheet name. It may be convenient to do the processing on a per-worksheet basis should the re-query of a single worksheet be needed.

The scanning may be done prior to the first UDF call because spreadsheets may limit the ability for UDF implementations to interrogate the hosting document for information, such as the cells containing formulas. In addition to scanning prior to the first UDF call, the scanning process may be done periodically to ensure that changes to the worksheets' formulas are captured.

As an example, Worksheet "Sheet1" and "Sheet2" contain the formulas in Table 1, below:

TABLE 1 example formulas

| Formula | Location |
| --- | --- |
| =Sum(GetValue("MyCube", "Time", "January", "Product", "Shoes"), GetValue("MyCube", "Time", VLookup("Label2", TableRef, 2), "Product", "Shoes"), 10) | Sheet1!$A$1 |
| =GetValue("MyCube", "Product", "Shirts", "Time", $A$5) | Sheet1!$B$27 |
| =GetValue("MyCube", "Time", VLookup("Label", TableRef, 2), "Product", "Shirts") | Sheet1!$C$28 |
| =GetValue("MyCube", "Time", "January", "Product", VLookup("Label", TableRef, 3)) | Sheet1!$C$29 |
| =GetValue("MyOtherCube", "Time", VLookup("Label", TableRef, 2), "Account", "Salary") | Sheet1!$H$10 |
| =GetValue("MyCube", "Time", "March", "Product", "Pants", "Account", "Salary") | Sheet2!$A$1 |
| =Sum($D$3:$D$10) | Sheet2!$A$2 |

The table keyed by worksheet name contains the range containing A1, B27, C28, C29, and H10 for "Sheet1" and the range containing A1 and A2 for "Sheet2".

"Sum" and "VLookup" are standard formulas while "GetValue" is the data access UDF that seeks a single data value from a data source external to the spreadsheet. "GetValue" has the cube being accessed as its first parameter and a variable number of dimension and member pairs after that that identify the cube crossing from which to access the value.

As for non-literal parameters to the captured formulas, Sheet1's B27 seeks the data value from A5, which contains the text "February". The VLookups in cells C28 and C29 seek to access the values of columns 2 and 3 for the row identified as "Label" in the table at TableRef, respectively. Column 2 of the row identified as "Label" contains "January" and column 3 containing "Pants." The row identified as "Label2" contains "March" at column 2.

When the first UDF called, the set of formula cells of the worksheet containing UDFs is obtained from the table using the Worksheet name as the key. The set of cells are iterated through, and the formulas in the set of cells are examined to find references to the UDF ("GetValue"). If no references are found in a cell, then processing continues to the next formula. For example, Sheet2's A2 is skipped as it contains no UDF reference. Sheet1's A1 is noted, as its Sum method has GetValue calls as some of its parameters.

If the UDF is found in one or more of the cells, then an attempt is made to parse the UDF's parameters. Three types of parameters are generally parsable: literal strings, numbers, and cell references. Literal strings are identified by being enclosed in quotes. Numbers are identified by calling C#'s Parse method on the appropriate number type. Anything else is a suspected cell reference.

A parameter hash table may be used to store resolved parameters as strings keyed by the parameter name. For example, Sheet1!B27's parameter $A$5's resolved string value is stored in a hash table keyed by "$A$5". Literal strings may not be stored in this hash table, however, as they are easy to identify, and the cost in terms of memory and execution time to store them in the parameter hash table may not be worthwhile.

An attempt is made to follow a suspected cell reference to the cell to which it refers and obtain that cell's value, which would then be the parameter value. For example, the parameter $A$5 above would be followed to cell A5 which contains the text value "February." The suspected cell reference may first be verified as valid. This may be accomplished by trying to resolve the parameter in the context of the UDF's worksheet. A cell reference without a workbook or worksheet qualifier is the most common case. $A$5 falls into this category. The UDF's Worksheet's get_Range method may be called, and if a valid range is returned, then the cell reference is valid.

```
range=worksheet.get_Range(parameter, Miss-
    ing.Value);
```

When a null range is returned, the spreadsheet data source manager may try to validate the cell reference at the workbook level. Such a procedure can resolve references such as "Sheet1!$A$5". This may be accomplished by calling the application's get_Range method.

```
Excel.Application application = worksheet.Application;
Excel.Workbook oldActiveWorkbook = application.ActiveWorkbook;
try
{
    // Activate the UDF's Workbook and call Excel Application's
    get_Range Excel.Workbook owningWorkbook = worksheet.Parent;
    owningWorkbook.Activate( );
    range = application.get_Range(parameter, Missing.Value);
}
catch (COMException) { ; }
finally
```

```
{
    // Restore the original active Workbook
    oldActiveWorkbook.Activate( );
}
```

Not only can the above code resolve references at the workbook level; it can also resolve references at the application level, such as "[Book1]Sheet1!$A$5."

If the range is still null, then the parameter, and by extension the UDF reference containing it, cannot be parsed. That reference is then skipped. From the example, Sheet1's C28, C29, and H10 are skipped in this manner because the VLookup is not a cell reference but rather a spreadsheet method invocation. Sheet1's A1's second GetValue is also skipped.

A successfully returned range indicates a valid cell reference. The text value of this range is then returned if possible. Failing this, the range's string Value (via get_Value) may be fetched and returned. Should that fail as well, then the parameter (and UDF) may be skipped.

Successfully resolved parameters' string values are stored in a parameter hash table for quick lookup. This may be especially beneficial when other UDF parameter lists include the stored parameters. Table 2 shows the resolved parameters from the example formulas found in Table 1.

TABLE 2 resolved parameters

| Formula | Resolved Parameters |
|---|---|
| =Sum(GetValue("MyCube", "Time", "January", "Product", "Shoes"), GetValue("MyCube", "Time", VLookup("Label2", TableRef, 2), "Product", "Shoes"), 10) | MyCube, Time, January, Product, Shoes (first GetValue) None (second GetValue) |
| =GetValue("MyCube", "Product", "Shirts", "Time", $A$5) | MyCube, Time, February, Product, Shirts |
| =GetValue("MyCube", "Time", VLookup("Label", TableRef, 2), "Product", "Shirts") | None |
| =GetValue("MyCube", "Time", "January", "Product", VLookup("Label", TableRef, 3)) | None |
| =GetValue("MyOtherCube", "Time", VLookup("Label", TableRef, 2), "Account", "Salary") | None |
| =GetValue("MyCube", "Time", "March", "Product", "Pants", "Account", "Salary") | MyCube, Time, March, Product, Pants, Account, Salary |
| =Sum($D$3:$D$10) | None |

The parameters successfully resolved may be checked to be sure that they match the UDF's signature. In GetValue's case the signature requires an odd number of strings, one identifying a cube and a number of dimension and member pairs identifying a crossing from which to get the data from the cube. For example, a UDF with parameters resolved to "MyCube", "Time", "Product", and "Shirts" will fail due to only having an even number of parameters because it is missing a time member. The parameter values may be validated as well, ensuring that a cube identified by "MyCube" exists, dimensions "Time" and "Product" exist, and that the referred members "January" and "Shirts" exist.

Next, one or more predicted bulk queries may be built. There may be a predicted bulk query for each cube accessed via the UDF. Should different sets of dimensions be referenced, there may be different predicted bulk queries for each. Table 3 depicts example predicted bulk queries for the present example:

TABLE 3 predicted queries

| Formula | Predicted Query |
|---|---|
| =Sum(GetValue("MyCube", "Time", "January", "Product", "Shoes"), GetValue("MyCube", "Time", VLookup("Label2", TableRef, 2), "Product", "Shoes"), 10) | MyCube with Time and Product (first GetValue) None (second GetValue) |
| =GetValue("MyCube", "Product", "Shirts", "Time", $A$5) | MyCube with Time and Product |
| =GetValue("MyCube", "Time", VLookup("Label", TableRef, 2), "Product", "Shirts") | None |
| =GetValue("MyCube", "Time", "January", "Product", VLookup("Label", TableRef, 3)) | None |
| =GetValue("MyOtherCube", "Time", VLookup("Label", TableRef, 2), "Account", "Salary") | None |
| =GetValue("MyCube", "Time", "March", "Product", "Pants", "Account", "Salary") | MyCube with Time, Product, and Account |
| =Sum($D$3:$D$10) | None |

As Table 3 shows, only two predicted queries are created form the example formulas. The predicted query is an instance of class CubeQuery:

```
public class CubeQuery
{
    public string cube;  // Cube query was issued on...
    public string tupleSignature; // Set of dimensions to query
    public Axis[ ] axes;    // Members for each dimension to query
    public QueryResult result; // Returned result...
    public Axis[ ] missed;    // Members for each dimension to query
    public int numIndividualRequests;    // Individual requests so far
}
public class Axis
{
    public string dimension;  // Dimension associated with the axis
    public string[ ] members; // Members to query
}
```

The tuple signature is a string comprising the ordered dimension identifiers for the dimensions represented by the predicted query. QueryResult contains the result of execution of the predicted bulk query.

For the UDFs being parsed, the predicted bulk query is located (or created if it does not yet exist), and any referenced member is added to the list of members for its dimension should it not be present. For example, a predicted bulk query with "MyCube" and dimensions "Time" and "Product" is created, and members "January" and "Shoes" are attached by adding them to the appropriate axes. The existing "MyCube" with dimensions "Time" and "Product" is located, and "February" (from A5) and "Shirts" are attached. A second predicted bulk query is created for "MyCube" with "Time", "Product", and "Account" dimensions represented.

The parameter values are used to build a key for a hash table that will store the requested data values. A hash table key may be a concatenation of all of the parameter values separated by a '_' (e.g., "MyCube_Time_January_Product_Shoes" for Sheet1!A1's first GetValue UDF reference). Prior to the execution of the predicted bulk queries, the values for these hash table keys may be a structure pointing to the associated predicted bulk query as well as a list of the dimension and member pairs needed to locate the value in the predicted bulk query's returned cube data, as shown in Table 4.

TABLE 4

UDF request to predicted queries hash entries

| Key | Value |
|---|---|
| MyCube_Time_January_Product_Shoes | MyCube with Time (January) and Product (Shoes) |
| MyCube_Product_Shirts_Time_February | MyCube with Time (February) and Product (Shirts) |
| MyCube_Time_March_Product_Pants_Account_Salary | MyCube with Time (March), Product (Pants), and Account (Salary) |

The values in Table 4 are in the form of TupleQuery instances. The TupleQuery class retains a predicted query, represented by the CubeQuery class, and a list of dimension and member pairs (tuples) representing the crossing for which data is being requested.

```
public class TupleQuery
{
    public Tuple[ ] tuples; // Requested crossing
    public CubeQuery cubeQuery; // Associated predicted query
}
public class Tuple
{
    public string member;
    public string dimension;
}
```

The external data source may execute the predicted queries. The result of these queries is then stored in CubeQuery's result field as a QueryResult instance, defined below. The class contains the values as a single-dimensional double array with the cardinalities and multipliers necessary to access the values as a cube. These cardinalities and multipliers are calculated by considering each CubeQuery's axes field's number of members.

```
public class QueryResult
{
    private int[ ] cardinalities;
    private int[ ] multipliers;
    private double[ ] values;
}
```

For the two predicted bulk queries, the data returned is represented by Tables 5 and 6.

TABLE 5 data returned from MyCube with Time and Product

| MyCube with Time and Product | January | February |
|---|---|---|
| Shoes | 1.0 | 2.0 |
| Shirts | 4.0 | 5.0 |

TABLE 6 data returned from MyCube with Time, Product, and Account

| MyCube with Time, Product, and Account (sliced by Account's Salary) | March |
|---|---|
| Pants | 11.0 |

Once the predicted bulk queries have returned from the server, the hash table of requests, keyed by the UDF parameters concatenated into a string, is iterated through and the temporary reference to the TupleQuery instance, shown in Table 4, may be replaced with the actual queried values. When each subsequent UDF request is received from the spreadsheet, the parameters are transformed into a key and the value stored in the hash table returned if it is present. Table 7 depicts an example hash table following execution of the predicted bulk query.

TABLE 7

UDF request to queried values

| Key | Value |
|---|---|
| MyCube_Time_January_Product_Shoes | 1.0 |
| MyCube_Product_Shirts_Time_February | 5.0 |
| MyCube_Time_March_Product_Pants_Account_Salary | 11.0 |

The requested value in the first UDF may then be returned to the spreadsheet.

Subsequent UDF requests may be handled by trying to obtain the requested value through a series of steps of increasing expense performance-wise. All of the UDF requests made by the spreadsheet have their parameters fully resolved by the spreadsheet, so the parameters are guaranteed to be correct. This is in contrast to the up-front parameter resolution attempted on the first UDF request. This includes not only resolving the situations that caused issues previously, like the VLookup, but also cases in which the parameter value was dependent on other cells. The up-front processing does not know about all of the formula dependencies and thus, may not be capable of resolving all of the parameters successfully.

With the parameters resolved, a key is generated by concatenating all of the parameter values separated by a '_'. Table 8 shows the resolved keys for the data access UDFs in the example.

TABLE 8 parameter-based keys for example UDFs

| Formula | Resolved Parameters |
|---|---|
| =Sum(GetValue("MyCube", "Time", "January", "Product", "Shoes"), | MyCube_Time_January_Product_Shoes (first GetValue) MyCube_Time_March_Product_Shoes (second |

TABLE 8-continued parameter-based keys for example UDFs

| Formula | Resolved Parameters |
|---|---|
| GetValue("MyCube", "Time", VLookup("Label2", TableRef, 2), "Product", "Shoes"), 10) | GetValue) |
| =GetValue("MyCube", "Product", "Shirts", "Time", $A$5) | MyCube_Product_Shirts_Time_February |
| =GetValue("MyCube", "Time", VLookup("Label", TableRef, 2), "Product", "Shirts") | MyCube_Time_January_Product_Shirts |
| =GetValue("MyCube", "Time", "January", "Product", VLookup("Label", TableRef, 3)) | MyCube_Time_January_Product_Pants |
| =GetValue("MyOtherCube", "Time", VLookup("Label", TableRef, 2), "Account", "Salary") | MyOtherCube_Time_January_Account_Salary |
| =GetValue("MyCube", "Time", "March", "Product", "Pants", "Account", "Salary") | MyCube_Time_March_Product_Pants_Account_Salary |
| =Sum($D$3:$D$10) | Data Access UDF not present, not called |

The hash table is consulted to see if the key is there. If the key is present, then the value is returned to the spreadsheet, saving a trip to the server.

Sometimes the key is not found in the hash table. This can happen for different reasons. Most likely is that the parameters couldn't be resolved up-front. This is possible when the parameters are not literal ("Shoes") or cell references ($A$1, named ranges, etc.) but rather constructed dynamically (via string concatenation, lookups, etc.) and are beyond the scope of the parameter resolution code. Failure to find the key can also occur when the value of the parameter changes due to some Visual Basic code or a dependent cell value changing after the initial parameter resolution was made.

In the event the key cannot be found in the hash table, the originally fetched data (the predicted query's result) is consulted because the requested data may have been fetched but not indexed in the hash table. As seen in Table 5 above, not only was the data for {January, Shoes} and {February, Shirts} returned from the predicted query but so was {January, Shirts} and {February, Shoes}. These data values were stored but were not incorporated into the hash table because they were not specifically requested by the resolved parameters of a UDF.

Should a request be received for either of those crossings, it may be advantageous to store the associated values with the requesting UDF's key and return the value to spreadsheet. This obviates a query to the external data source. The value is added to the hash table for fast future access, as there may be other UDF requests with an identical key.

If the data is not already in the hash table nor found locally, then it may be necessary to go to the external data source to retrieve it. Because this can be expensive if done numerous times, there may be a threshold of these individual supplemental queries allowed before another bulk query is performed that augments the original predicted bulk query with those members that were missing from the predicted bulk query but present as part of later resolved UDFs' parameters.

Examples of this are MyCube_Time_March_Product_Shoes and MyCube_Time_January_Product_Pants, both of which had parameters (March and Pants, respectively) that were beyond the scope of the predicted query due to being resolved by the VLookup function. The appropriate CubeQuery is located for the request, and the missing members are added to CubeQuery's missed field in the axis for the appropriate dimension. Should the threshold be reached, these members are used to create a modified bulk query.

In some cases a predicted query was never attempted for a UDF's requested cube and dimensions. Such a case is the example key, MyOtherCube_Time_January_Account_Salary. In this case, a VLookup prevented parsing of the UDF up-front, and no other UDFs requested data from cube MyOtherCube. A new CubeQuery may be created and the missing members are added to the CubeQuery's missed field as described above.

If the number of individual server queries allowed for the associated query (e.g., MyCube with Time and Product) has not been reached, then a supplemental request may made for the single data value being requested by the UDF. Once returned from the server, this value is stored according to the requesting UDF's parameter-based key in the hash table and returned to the spreadsheet. The request's CubeQuery's numIndividualRequests field may be incremented by one to indicate that a request has been made.

If the threshold for the number of individual server requests for the associated query has been reached, then a modified bulk query is performed that considers the existing predicted query members and any additional ones that were revealed through the spreadsheet calling the data access UDF with fully resolved parameters.

The missing members are located in CubeQuery's missed field segregated by dimension. These members are added to the end of the appropriate axis located in CubeQuery's axes field, and the missed field is cleared. A new server query is issued with the old result being replaced. Table 9 shows the new result based on the UDFs MyCube_Time_March_Product_Shoes and MyCube_Time_January_Product_Pants having introduced the missing members March and Pants.

TABLE 9 data returned from MyCube with Time and Product after re-query

| MyCube with Time and Product | January | February | March |
|---|---|---|---|
| Shoes | 1.0 | 2.0 | 3.0 |
| Shirts | 4.0 | 5.0 | 6.0 |
| Pants | 7.0 | 8.0 | 9.0 |

A number of individual server requests up to the threshold are again allowed by resetting the numIndividualRequests field for the query to zero. With the larger result from the CubeQuery there is a higher chance that future requests will be satisfied (such as {January, Pants}, {February, Pants}, {March, Shoes}, {March, Shirts}), saving a server request.

Once the larger modified bulk query has been performed, the requesting UDF's value is stored in the hash table for easier lookup on subsequent UDF requests, and the value returned to the spreadsheet.

Following is the example recast in execution order. Table 10 enumerates the cells containing formulas and the order in which these formulas are evaluated by the spreadsheet.

TABLE 10 example formulas by order of execution

| Formula | Location |
|---|---|
| 1. =Sum(GetValue("MyCube", "Time", "January", "Product", "Shoes"), GetValue("MyCube", "Time", VLookup("Label2", TableRef, 2), "Product", "Shoes"), 10) | Sheet1!$A$1 |
| 2. =GetValue("MyCube", "Product", "Shirts", "Time", $A$5) | Sheet1$B$27 |
| 3. =GetValue("MyCube", "Time", VLookup("Label", TableRef, 2), "Product", "Shirts") | Sheet1$C$28 |
| 4. =GetValue("MyCube", "Time", "January", "Product", VLookup("Label", TableRef, 3)) | Sheet1$C$29 |
| 5. =GetValue("MyOtherCube", "Time", VLookup("Label", TableRef, 2), "Account", "Salary") | Sheet1$H$10 |
| 6. =GetValue("MyCube", "Time", "March", "Product", "Pants", "Account", "Salary") | Sheet2!$A$1 |
| 7. =Sum($D$3:$D$10) | Sheet2!$A$2 |

The spreadsheet encounters the formula in cell A1: GetValue ("MyCube", "Time", "January", "Product", "Shoes"). The spreadsheet evaluates the first of two GetValues present in formula 1 and provides the UDF request to the spreadsheet data source manager. The previously obtained cells containing formulas are reduced to those that contain references to the data access UDF. This eliminates formula 7 above in Table 10.

The remaining formulas are further processed to parse the parameters to the data access UDFs. Only formulas 1, 2, and 6 can be parsed.

Predicted bulk queries are created from the parameters of the UDFs that were successfully parsed. As formula 1 (first GetValue) and 2 share the same predicted query signature (a combination of the cube and the set of dimensions), there are only two predicted bulk queries. These are shown in Table 11.

TABLE 11 predicted queries

| Predicted Query | Individual Requests |
|---|---|
| 1. MyCube with Time (January, February) and Product (Shoes, Shirts) | 0 |

TABLE 11-continued predicted queries

| Predicted Query | Individual Requests |
|---|---|
| 2. MyCube with Time (March), Product (Pants), and Account (Salary) | 0 |

A server request is made to perform the predicted queries. The values returned for the UDF requests that could be parsed are stored in the hash table, using the parameters s keys. The value, 1.0, for the first UDF request (formula 1's first GetValue) is then returned.

The spreadsheet encounters a second UDF and resolves the parameters of the UDF: GetValue ("MyCube", "Time", VLookup ("Label2", TableRef, 2), "Product", "Shoes"). The second UDF request is provided to the spreadsheet data source manager. The request's parameters are used to form the key MyCube_Time_March_Product_Shoes. Because this value is not found in the hash table, further searching is needed.

It is determined that the MyCube_Time_March_Product_Shoes predicted bulk query, did not retrieve up the requested crossing (i.e., time member March is not present in query 1). Thus, this crossing is added to that CubeQuery's missed field for time, as seen in Table 12.

TABLE 12 queries (italics indicate missed members)

| Query | Individual Requests |
|---|---|
| 1. MyCube with Time (January, February, *March*) and Product (Shoes, Shirts) | 0 |
| 2. MyCube with Time (March), Product (Pants), and Account (Salary) | 0 |

Because the threshold for individual server queries has not been reached, an individual supplemental query for {March, Shoes} is performed, and the value, 3.0, is stored in the hash table, as shown in Table 13, and returned to the spreadsheet. The query's numIndividualRequests field is increased by one.

TABLE 13

UDF request to queried values

| Key | Value |
|---|---|
| MyCube_Time_January_Product_Shoes | 1.0 |
| MyCube_Product_Shirts_Time_February | 5.0 |
| MyCube_Time_March_Product_Pants_Account_Salary | 11.0 |
| MyCube_Time_March_Product_Shoes | 3.0 |

The spreadsheet next encounters a third UDF request: GetValue ("MyCube", "Product", "Shirts", "Time", $A$5). The third UDF request is provided to the spreadsheet data source manager. The key, MyCube_Product_Shirts_Time_February, is constructed and determined to be in the hash table with a value of 5.0. The value is returned to the spreadsheet to complete the request.

The spreadsheet next encounters a fourth UDF request: GetValue ("MyCube", "Time", VLookup ("Label", TableRef, 2), "Product", "Shirts"). The fourth UDF request is provided to the spreadsheet data source manager. The key, MyCube_Time_January_Product_Shirts, is constructed from the resolved parameters and is not found in the cache.

The spreadsheet data source manager determines that the value was fetched as part of the predicted bulk query. The value, 4.0, is stored in the hash table, resulting in the cache shown in Table 14, and returned to the spreadsheet.

TABLE 14

UDF request to queried values

| Key | Value |
|---|---|
| MyCube__Time__January__Product__Shoes | 1.0 |
| MyCube__Product__Shirts__Time__February | 5.0 |
| MyCube__Time__March__Product__Pants__Account__Salary | 11.0 |
| MyCube__Time__March__Product__Shoes | 3.0 |
| MyCube__Time__January__Product__Shirts | 4.0 |

The spreadsheet next encounters a fifth UDF request: GetValue ("MyCube", "Time", "January", "Product", VLookup ("Label", TableRef, 3)). The fifth UDF request is provided to the spreadsheet data source manager. The key is calculated as MyCube_Time_January_Product_Pants, which is not found in the hash table. It is determined that the value was not fetched with the associated bulk query, MyCube with Time and Product (query 1).

The spreadsheet data source manager notes that the Product member Pants is missing from the predicted bulk query and adds it to the query, as shown in Table 15.

TABLE 15 queries (italics indicate missed members)

| Query | Individual Requests |
|---|---|
| 1. MyCube with Time (January, February, *March*) and Product (Shoes, Shirts, *Pants*) | 1 |
| 2. MyCube with Time (March), Product (Pants), and Account (Salary) | 0 |

The spreadsheet data source manager determines that the threshold for number of individual server queries has been reached. The missed members, shown in Table 15 are added to the request axes field in CubeQuery, and the spreadsheet data source manager issues a server query. The modified bulk query list is shown in Table 16. The UDF request is added to the hash table, as shown in Table 17, and the value, 7.0, returned to the spreadsheet. The query's numIndividualRequests field is reset to zero.

TABLE 16 queries (italics indicate missed members)

| Query | Individual Requests |
|---|---|
| 1. MyCube with Time (January, February, March) and Product (Shoes, Shirts, Pants) | 0 |
| 2. MyCube with Time (March), Product (Pants), and Account (Salary) | 0 |

TABLE 17

UDF request to queried values

| Key | Value |
|---|---|
| MyCube__Time__January__Product__Shoes | 1.0 |
| MyCube__Product__Shirts__Time__February | 5.0 |

TABLE 17-continued

UDF request to queried values

| Key | Value |
|---|---|
| MyCube__Time__March__Product__Pants__Account__Salary | 11.0 |
| MyCube__Time__March__Product__Shoes | 3.0 |
| MyCube__Time__January__Product__Shirts | 4.0 |
| MyCube__Time__January__Product__Pants | 7.0 |

The spreadsheet next encounters a sixth UDF request: GetValue ("MyOtherCube", "Time", VLookup ("Label", TableRef, 2), "Account", "Salary"). The sixth UDF request is received by the spreadsheet data source manager, and the parameter-based key, MyOtherCube_Time_January_Account_Salary, is generated. This key is not present in the hash table.

The spreadsheet data source manager determines that the value was not queried by virtue of a predicted bulk query or modified bulk query. A new query is thus generated, as shown below in Table 18 as query 3.

TABLE 18 queries (italics indicate missed members)

| Query | Individual Requests |
|---|---|
| 1. MyCube with Time (January, February, March) and Product (Shoes, Shirts, Pants) | 0 |
| 2. MyCube with Time (March), Product (Pants), and Account (Salary) | 0 |
| 3. MyOtherCube with Time (*January*) and Account (*Salary*) | 0 |

The spreadsheet data source manager determines that the threshold of supplemental data source queries has not been met and performs a supplemental request for the value, 21.0. The value is stored in the hash table, as shown in Table 19, and is returned to the spreadsheet. Query 3's numIndividualRequests is increased by one.

TABLE 19

UDF request to queried values

| Key | Value |
|---|---|
| MyCube__Time__January__Product__Shoes | 1.0 |
| MyCube__Product__Shirts__Time__February | 5.0 |
| MyCube__Time__March__Product__Pants__Account__Salary | 11.0 |
| MyCube__Time__March__Product__Shoes | 3.0 |
| MyCube__Time__January__Product__Shirts | 4.0 |
| MyCube__Time__January__Product__Pants | 7.0 |
| MyOtherCube__Time__January__Account__Salary | 21.0 |

The spreadsheet next encounters a seventh UDF request: GetValue ("MyCube", "Time", "March", "Product", "Pants", "Account", "Salary"). A key of MyCube_Time_March_Product_Pants_Account_Salary is calculated. This value is in the cache, and its value, 11.0, is returned to the spreadsheet.

The spreadsheet data source manager may be implemented, for example, as a Microsoft Excel add-in for SAS Financial Management to improve performance when a user fetches values from an ODCS server via the CDAGet UDF. The CDAGet UDF has the following signature:
DAGet(cube_code, dimension1_code, member1_code, . . . )

A variable number of dimension and member pairs may be specified, with unspecified dimensions defaulting to a member defined by the server. A code is a unique string used by the server to identify dimensions and code, for example a "TIME" dimension with a "SEP2010" member.

The UDF may be implemented in VBA and deployed as a XLA. The UDF may call into the add-in code which is implemented in C# and .Net.

An Excel add-in may support the construction of tables based on CDAGet. These tables may consist of thousands or even tens of thousands of individual UDFs. The CDAGet parameters consist of references to cells that contain the cube, dimension and member codes necessary to complete the request.

A user may also use the CDAGet UDF in any Excel cell formula by typing the formula in manually. In this way the user has control over the formatting of the document.

The data provider, SAS Financial Management's server, may expose query methods via a SOAP-based API. The backend may be implemented in Java and return results using the proprietary ODCS computation engine. This engine may compute requested values on the fly from the base facts in the database.

Execution times without the techniques described herein were on the order of tens of minutes for tens of thousands of fetches. With the technique outlined herein, the time was reduced to, in many cases, a few seconds. For smaller cases, near immediate response time was achieved.

Figure 12A:
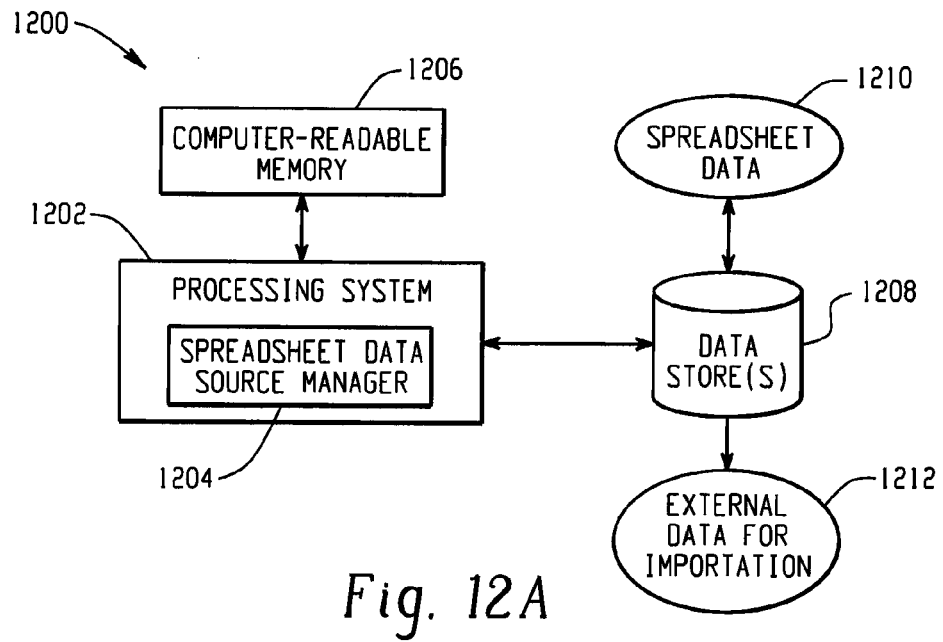
FIGS. 12A, 12B, and 12C depict example systems for spreadsheet data source management.
Figure 12B:
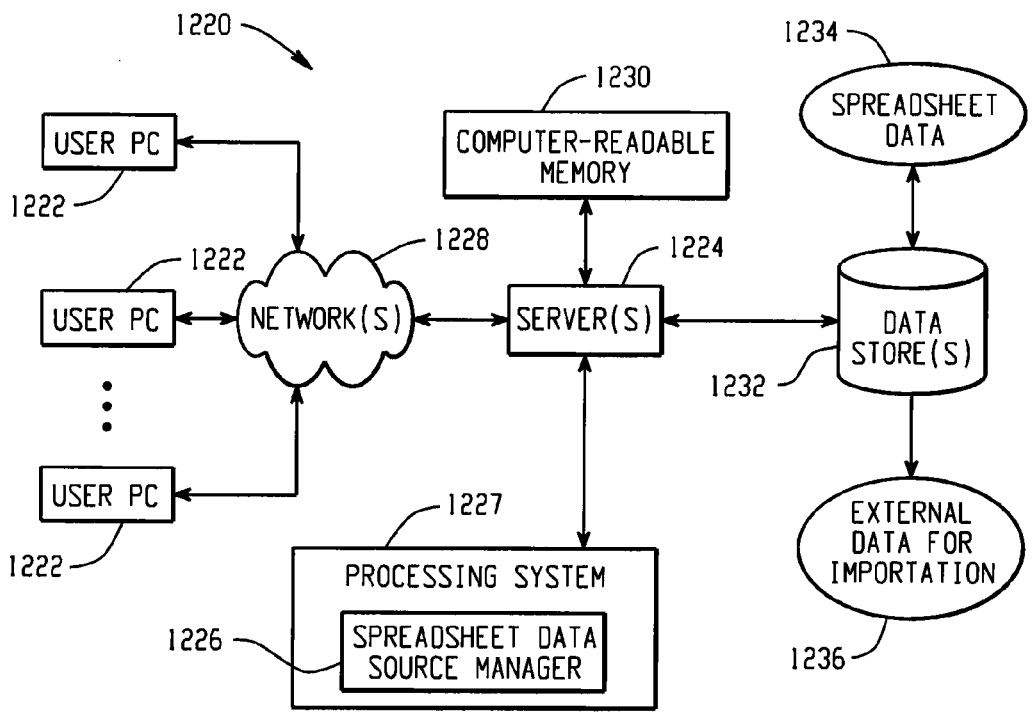
Figure 12C:
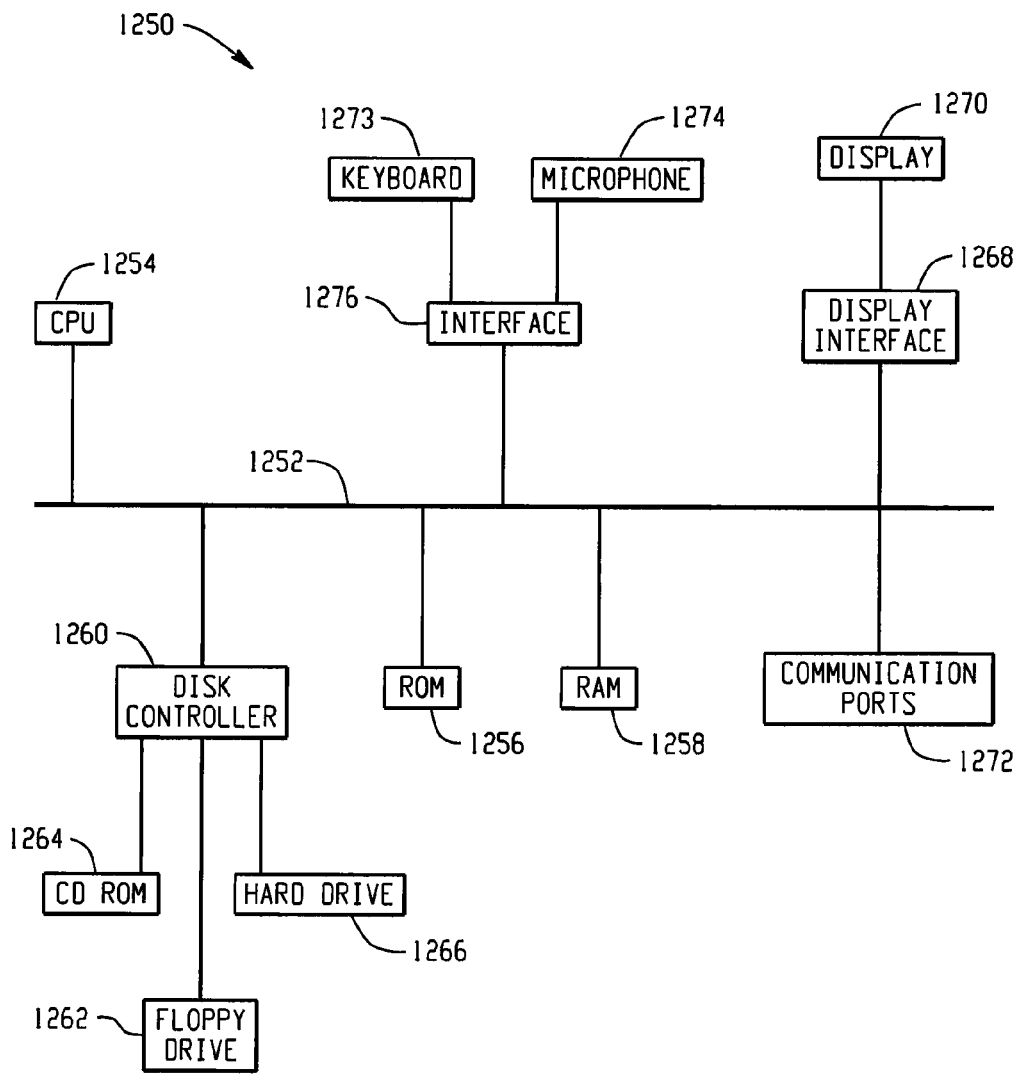

FIGS. 12A, 12B, and 12C depict example systems for spreadsheet data source management. For example, FIG. 12A depicts an exemplary system 1200 that includes a stand alone computer architecture where a processing system 1202 (e.g., one or more computer processors) includes a system for spreadsheet data source management 1204 being executed on it. The processing system 1202 has access to a computer-readable memory 1206 in addition to one or more data stores 1208. The one or more data stores 1208 may contain spreadsheet data 1210 as well as external data for importation 1212.

FIG. 12B depicts a system 1220 that includes a client server architecture. One or more user PCs 1222 accesses one or more servers 1224 running a system for spreadsheet data source management 1226 on a processing system 1227 via one or more networks 1228. The one or more servers 1224 may access a computer readable memory 1230 as well as one or more data stores 1232. The one or more data stores 1232 may contain spreadsheet data 1234 as well as external data for importation 1236.

FIG. 12C shows a block diagram of exemplary hardware for a stand alone computer architecture 1250, such as the architecture depicted in FIG. 12A, that may be used to contain and/or implement the program instructions of system embodiments described herein. A bus 1252 may serve as the information highway interconnecting the other illustrated components of the hardware. A processing system 1254 labeled CPU (central processing unit) (e.g., one or more computer processors), may perform calculations and logic operations required to execute a program. A processor-readable storage medium, such as read only memory (ROM) 1256 and random access memory (RAM) 1258, may be in communication with the processing system 1254 and may contain one or more programming instructions for spreadsheet data source management. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1260 interfaces with one or more optional disk drives to the system bus 1252. These disk drives may be external or internal floppy disk drives such as 1262, external or internal CD-ROM, CD-R, CD-RW or DVD drives such as 1264, or external or internal hard drives 1266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1260, the ROM 1256 and/or the RAM 1258. Preferably, the processor 1254 may access each component as required.

A display interface 1268 may permit information from the bus 1252 to be displayed on a display 1270 in audio, graphic, or alphanumeric format. Communication with external devices may optionally occur using various communication ports 1272.

In addition to the standard computer-type components, the hardware may also include data input devices, such as a keyboard 1273, or other input device 1274, such as a microphone, remote control, pointer, mouse and/or joystick.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output.

The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results It is claimed:

1. A computer-implemented method of importing data into a spreadsheet from a data source external to the spreadsheet, wherein the spreadsheet comprises a grid of cells arranged into rows and columns, wherein a cell of the grid is configured to contain a value or a formula, the method comprising:

identifying a set of cells containing formulas, wherein an identification of a cell and the formula in the cell are stored;

executing a first user defined function to access a particular data record from the external data source, said executing the first user defined function comprising:

determining, by use of one or more data processors, which of the stored formulas contain user defined functions to access data records from the external data source, wherein a user defined function to access a data record includes parameters identifying the data record to be accessed;

resolving parameters of the identified user defined functions using the one or more data processors, wherein certain parameters are not resolved, wherein certain user defined functions have sufficient parameters resolved to identify a data record in the external data source;

generating a bulk query to the external data source requesting data for the certain user defined functions having sufficient parameters resolved, including the first user defined function, using the one or more data processors, wherein the bulk query requests more data records than are specified by the user defined functions;

storing the data records specified by the user defined functions that have resolution of sufficient parameters in a table for subsequent access;

storing the more data records than are specified in a memory for subsequent access; and returning the particular data record from the table to the spreadsheet.

2. The method of claim 1, further comprising:
executing a second user defined function to access a second data record from the external data source, wherein executing the second user defined function includes:
determining whether the second data record is stored in the table; and
returning the second data record to the spreadsheet when the second data record is stored in the table.

3. The method of claim 2, wherein executing the second user defined function further includes:
determining whether the second data record is stored in the memory when the second data record is not stored in the table;
adding the second data record to the table when the second data record is stored in the memory; and
returning the second data record to the spreadsheet when the second data record is stored in the table.

4. The method of claim 3, wherein executing the second user defined function further includes:
querying the external data source for the second data record when the second data record is not stored in the memory; and
returning the second data record to the spreadsheet.

5. The method of claim 3, wherein executing the second user defined function further includes:
when the second data record is not stored in the memory:
generating a modified bulk query based on the bulk query and the second data record identified in the second user defined function;
incrementing a count;
determining whether the count has reached a threshold;
executing the modified bulk query when the count has reached the threshold;
querying the external data source for only the second data record when the count has not reached the threshold; and
returning the second data record to the spreadsheet.

6. The method of claim 5, further comprising resetting the count after executing the modified bulk query.

7. The method of claim 1, wherein a parameter is resolved when the parameter is a value or a reference to a value in another cell.

8. The method of claim 1, wherein the table is a hash table.

9. The method of claim 1, wherein the spreadsheet prevents a user defined function in a particular cell from modifying data in cells other than the particular cell.

10. A computer-implemented system for importing data into a spreadsheet from a data source external to the spreadsheet, wherein the spreadsheet comprises a grid of cells arranged into rows and columns, wherein a cell of the grid is configured to contain a value or a formula, the method comprising:
a data processor;
a computer-readable memory encoded with instructions for commanding the data processor to execute steps including:
identifying a set of cells containing formulas, wherein an identification of a cell and the formula in the cell are stored;
executing a first user defined function to access a particular data record from the external data source, said executing the first user defined function comprising:
determining, by use of one or more data processors, which of the stored formulas contain user defined functions to access data records from the external data source, wherein a user defined function to access a data record includes parameters identifying the data record to be accessed;
resolving parameters of the identified user defined functions using the one or more data processors, wherein certain parameters are not resolved, wherein certain user defined functions have sufficient parameters resolved to identify a data record in the external data source;
generating a bulk query to the external data source requesting data for the certain user defined functions having sufficient parameters resolved, including the first user defined function, using the one or more data processors, wherein the bulk query requests more data records than are specified by the user defined functions;
storing the data records specified by the user defined functions that have resolution of sufficient parameters in a table for subsequent access;
storing the more data records than are specified in a memory for subsequent access; and
returning the particular data record from the table to the spreadsheet.

11. The system of claim 10, wherein the steps further comprise:
executing a second user defined function to access a second data record from the external data source, wherein executing the second user defined function includes:
determining whether the second data record is stored in the table; and
returning the second data record to the spreadsheet when the second data record is stored in the table.

12. The system of claim 11, wherein executing the second user defined function further includes:
determining whether the second data record is stored in the memory when the second data record is not stored in the table;
adding the second data record to the table when the second data record is stored in the memory; and
returning the second data record to the spreadsheet when the second data record is stored in the table.

13. The system of claim 12, wherein executing the second user defined function further includes:
querying the external data source for the second data record when the second data record is not stored in the memory; and
returning the second data record to the spreadsheet.

14. The system of claim 12, wherein executing the second user defined function further includes:
when the second data record is not stored in the memory:
generating a modified bulk query based on the bulk query and the second data record identified in the second user defined function;
incrementing a count;
determining whether the count has reached a threshold;
executing the modified bulk query when the count has reached the threshold;
querying the external data source for only the second data record when the count has not reached the threshold; and
returning the second data record to the spreadsheet.

15. The system of claim 14, wherein executing the second user defined function further includes resetting the count after executing the modified bulk query.

16. The system of claim 10, wherein a parameter is resolved when the parameter is a value or a reference to a value in another cell.

17. The system of claim 10, wherein the table is a hash table.

18. The system of claim 10, wherein the spreadsheet prevents a user defined function in a particular cell from modifying data in cells other than the particular cell.

19. A computer readable memory encoded with instructions for performing a method of importing data into a spreadsheet from an data source external to the spreadsheet, wherein the spreadsheet comprises a grid of cells arranged into rows and columns, wherein a cell of the grid is configured to contain a value or a formula, the method comprising:

identifying a set of cells containing formulas, wherein an identification of a cell and the formula in the cell are stored;

executing a first user defined function to access a particular data record from the external data source, said executing the first user defined function comprising:

determining, by use of one or more data processors, which of the stored formulas contain user defined functions to access data records from the external data source, wherein a user defined function to access a data record includes parameters identifying the data record to be accessed;

resolving parameters of the identified user defined functions using the one or more data processors, wherein certain parameters are not resolved, wherein certain user defined functions have sufficient parameters resolved to identify a data record in the external data source;

generating a bulk query to the external data source requesting data for the certain user defined functions having sufficient parameters resolved, including the first user defined function, using the one or more data processors, wherein the bulk query requests more data records than are specified by the user defined functions;

storing the data records specified by the user defined functions that have resolution of sufficient parameters in a table for subsequent access;

storing the more data records than are specified in a memory for subsequent access; and returning the particular data record from the table to the spreadsheet.

\* \* \* \* \*